United States Patent [19]

Yang et al.

[11] Patent Number: 4,842,383

[45] Date of Patent: Jun. 27, 1989

[54] ELECTRODELESS PLATING METHOD FOR COMBINING THE POLYMERIZATION AND THE COATING OF ELECTROCHROMIC POLYMERS

[75] Inventors: Sze C. Yang, Kingston; Robert L. Clark, Middletown, both of R.I.

[73] Assignee: Board of Governors for Higher Education, State of Rhode Island and Providence Plantations, Providence, R.I.

[21] Appl. No.: 203,270

[22] Filed: Jun. 7, 1988

Related U.S. Application Data

[63] Continuation-in-part of Ser. No. 858,384, May 1, 1986, Pat. No. 4,749,260.

[51] Int. Cl.$^4$ ............................ G02F 1/01; G02F 1/17
[52] U.S. Cl. ..................................................... 350/357
[58] Field of Search ....................... 350/357, 355, 356; 340/785

[56] References Cited

U.S. PATENT DOCUMENTS 4,586,792  5/1986  Yang et al. ........................... 350/357
4,749,260  6/1988  Yang et al. ........................... 350/357

FOREIGN PATENT DOCUMENTS 2166319  7/1987  Japan .................................... 350/357

Primary Examiner—Eugene R. LaRoche
Assistant Examiner—Nathan W. McCutcheon
Attorney, Agent, or Firm—Samuels, Gauthier, Stevens & Kehoe

[57] ABSTRACT

A method of forming a thin film of an electrochromic material is disclosed. The method involves coating an acidic solution containing monomeric aniline and effective amounts of an oxidant and a catalyst on the surface on which the electrochromic film is to be formed. The monomeric aniline polymerizes in situ on the surface to from the electrochromic film.

12 Claims, 1 Drawing Sheet

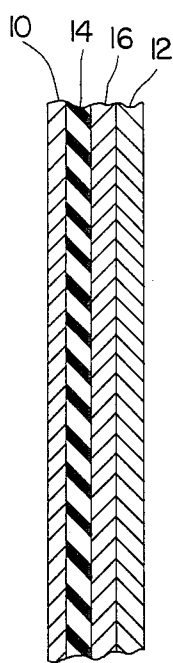

ELECTRODELESS PLATING METHOD FOR COMBINING THE POLYMERIZATION AND THE COATING OF ELECTROCHROMIC POLYMERS

This is a continuation-in-part of copending applications Ser. No. 858,384 filed on May 1, 1986, now U.S. Pat. No. 4,749,260.

BACKGROUND AND BRIEF SUMMARY OF THE INVENTION

Electrochromism describes the induction of a color change in a medium as a result of charge transfer or electron transfer caused by an externally applied potential. The color changes are indications of induced chemical changes in the species of interest. For most chemical species exhibiting this effect, the change is from one color to another.

The prior art in this field is set forth in my previously issued U.S. Pat. No. 4,386,792 and pending application Ser. No. 858,384 filed May 1, 1986 and Ser. No. 180,399 filed Apr. 12, 1988.

The prior invention embodied an electronic display element useful in electronic color display devices. Broadly, that invention comprised two electrodes, at least one electrode being transparent. A thin film of polymeric aniline or its chemical derivatives was electrolytically plated on one electrode using an acidic solution containing the monomeric aniline. After the polymer film was coated, the solution was replaced by an electrolyte which did not contain the aniline monomer. The electrolyte plated the other electrode and interfaced with the polyaniline.

The electrolytic process for plating the aniline and electrolyte material is time consuming and energy intensive. Further, it is difficult to uniformly plate large non-planar surfaces, such as the wall of an existing building.

It would be desirable to coat the electrochromic material non-electrochemically on the electrode by brushing, spraying, dipping, screen printing, etcetera.

This invention broadly embodies an electrodeless process of coating the electrochromic polymer on an electrode or surface. The aniline monomer is polymerized and coated as polyaniline in thin film form on a substrate.

The process involves adding a chemical oxidant to a solution of aniline to effect the polymerization of the monomer at an electrode surface to form a layer of electrochromic material. In the preferred embodiment a catalyst is used to enhance the affinity and adhesion of the polymer to the surface. This method, therefore, combines the polymerization of the monomer and the coating of the thin film of the electrochromic polymer on an electrode without the use of electrolysis. A polymer electrolyte is then coated on or a polymer electrolyte film is placed in ion transfer relationship with the electrochromic polymer and an electrode.

BRIEF DESCRIPTION OF THE DRAWINGS

The drawing is an illustration of an electrochromic device produced according to the teachings of the invention.

DESCRIPTION OF THE PREFERRED EMBODIMENT

Two properties of polyaniline that are unique for organic polymers, and are highly desirable for a color switchable panel are: (1) the capability for multi-color switching, and (2) the capability of producing a transparent form at a reducing potential. The transparent form provides the needed high contrast in display.

A polymer backbone structure containing aromatic rings linked by nitrogen atoms is favorable to the electrochromic properties because of the stability of these colored polymer radicals and anions. Polymers built from monomers with structures I, II and III (see below) all have such favorable backbone structures and they are suitable as an electrochromic material.

The addition of substituent groups to the aromatic rings can alter the properties of the films. Electron withdrawing substituents such as methoxy groups would lower the oxidation potentials, whereas electron donating groups will tend to raise these potentials. In addition the steric interaction of the substituent also influences the electrochemical potential for color switching. Thus, the window of accessible potentials is tuned as will the color of the films, due to changes in electronic structure. Appropriate choice of a combination of substituent groups will provide flexibility in modifying the electrochromic properties of the polymer films. By choosing a combination of substituent groups the electrochromic properties of the polmer film can be modified.

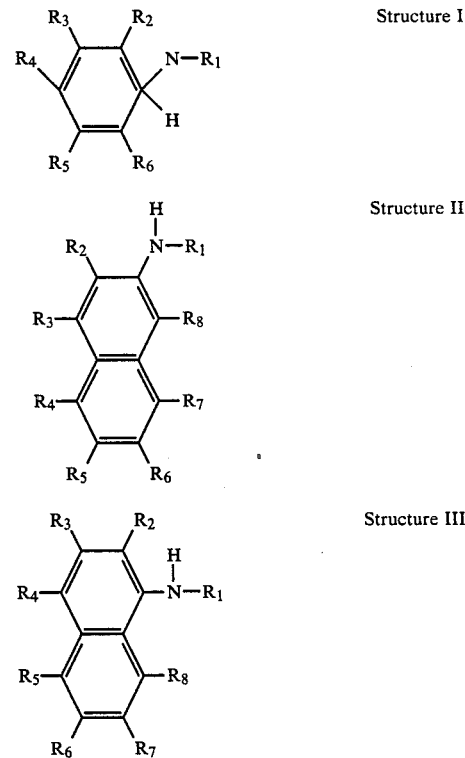

Structure I

Structure II

Structure III

These polymers can be prepared from the monomers of the structures I, II, and III where $R_1$ to $R_8$ = any one of the following:

$-H$, $-(CH_2)_nCH_3$ (n = o to 10), $-OCH_3$, $-OC_2H_5$, $-NH_2$ $-Cl$, $-F$, $-Br$, $-I$, $-CN$, $-SO_3H$, $-\underset{O}{\overset{\|}{C}}-OH$, $-\underset{CH_3}{\overset{|}{C}}=O$ -continued

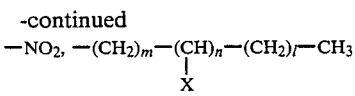

(where m, n, l = 0 to 5 and x = any of the above groups)

Polymer electrolytes, and preferably solid polymer electrolytes, are used for the electrochromic device such as Poly-(vinylsulfonic acid); $[-CH_2CH(SO_3H)-]_n$ or its salts; Poly-(acrylic acid), $[-CH_2CH(CO_2H)-]_n$; Poly-(styrene sulfonic acid), $[-CH_2CH(C_6H_4SO_3H)-]_n$; Poly-(2-acrylamido-2-methyl-1-propanesulfonic acid) $(-CH_2CH[CONHC(CH_3)_2CH_2SO_3H]-]_n$; Poly-(vinyl alcohol), $(-CH_2CH(OH)-)_n$ Poly-(ethylene oxide), $(-CH_2CH_2O-)_n$; Polyphosphazenes, a family of polymers with polyphosphzene backbones and polyether side groups, for example:

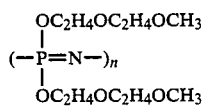

Referring to the FIGURE, electrodes 10 and 12 which may comprise glass, plastic or metal sheets (at least one of which is transparent) are coated on their inwardly facing surfaces with a conductive film such as tin oxide, indium oxide, platinum or gold. The electrode 10 has a thin film 14 of polyaniline coated thereon. A polymer electrolyte film 16 contacts the film 14 and the electrode 12 forming an electrochromic device. The electrical leads for the electrodes are not shown.

The relative thicknesses of the electrode coatings, polyaniline, and polyelectrolyte may vary; illustrative ranges include 0.1 to 1.0 microns for the electrode layers; 0.01 to 0.10 microns for the polyaniline and 10 microns to one mm for the polymer electrolyte.

EXAMPLE I

Monomers having any of the structures I, II or III, or combinations thereof, are dissolved in an aqueous solution of organic or inorganic acid such as HCl, $H_2SO_4$, $H_3PO_4$, acetic acid, sodium acetate, potassium phthalates, etcetera. Electrolytes such as potassium choloride, lithium chloride, sodium chloride, etcetera can be added to enhance the conductivity of the polymer electrolyte. Specifically, 15 ml of the monomer is dissolved in 100 ml of 3 molar HCl by stirring. Also added shortly before usage is an oxidant, 30 ml of hydrogen peroxide, 3% aqueous solution, and a catalyst 1 ml of 0.1 molar, ferric chloride (or stannic chloride). The resulting mixture is coated on the electrode 10 by brushing or spraying where it polymerizes 'in situ' and adheres to the surface as an electrochromic film 12. This coating can also be effected by immersing the electrode in the solution and then withdrawing the electrode.

EXAMPLE II

The procedures for film forming are similar to Example I, except that the catalyst, the ferric chloride (or the stannic chloride) is not added to the solution containing the monomer but used as a separate solution. A ferric chloride solution 0.1 M concentration is first brushed, sprayed, or silk screen printed in any desired pattern on the electrode 10. A solution containing the monomer and the oxidant, as described above, is then sprayed on the surface of the ferric chloride coated electrode. The polymer electrochromic material is formed within 1 to 10 minutes. The residual monomer and oxidants are washed away by rinsing with distilled water or a low concentration amonium hydroxide solution. The ferric chloride (or stannic chloride) absorbed on the surface catalyzes the polymerization of the aniline at the treated area. The polymerization reaction at the treated area of the surface is much more complete than that at the untreated area. This two-step process is useful for forming patterns of the electrochromic material by selectively activating specific areas on the surface.

The catalyst, the ferric salt, can be replaced by stanic, cupric, mercuric and cerium salts. The oxidant hydrogen peroxide can be replaced by potassium chromate, or other chromates. There are other oxidants that work well for this purpose. We found that most oxidants with an oxidation potential of higher than that of the ferric/ferrous pair (+0.77V vs. standard hydrogen potential) works well.

Use of a brush to apply the catalytic material onto the surface is a simple way to create the desired pattern. Another method which is amenable to large scale production involves using silk or stainless screen printing techniques.

Polymer electrolyte 16 per se is applied to the film 14. This polymer electrolyte can be brushed on as with the film 14. Preferably, it is separately prepared in sheet form and simply sandwiched between the film 14 and the electrode coating of the electrode 12.

The relative ranges by weight percent of the components in the monomeric aniline solution based on the original weight of the solution and using the concentrations described in Example I are as follows: monomeric aniline 1 to 30%; catalysts 1 to 10%; oxidant 3 to 30%.

Suitable catalysts include ferric and stanic salts (such as chlorides, sulfates etc.).

Suitable oxidants include hydrogen peroxide, potassium chromate or any oxidation reagents with a standard oxidation potential higher than 0.77V relative to the standard hydrogen/H+ scale.

With this electrodeless plating method, the range of surfaces that can be coated with the color-switchable polymer is expanded. In many circumstances, the electrodeless one step process is more economical than the electrode plating method. An example is that the coating can be done on large work pieces such as an existing building. It is not possible to immerse the building in an electrolysis bath to accomplish the electroplating of polymer. It is, however, not difficult to use a spray paint method to spray the oxidant and catalyst solution onto the surface of the building and then spray the monomer containing solutions onto the surface to form the polymer coating.

Having described our invention, what we now claim is:

1. A method for forming a thin film of an electrochromic material on a surface which includes:
   coating on said surface an acidic solution containing monomeric aniline and effective amounts of an oxidant and a catalyst, the monomeric aniline polymerizing in situ on said surface to form an electrochromic film.

2. The method of claim 1 wherein the monomeric aniline is selected from the group consisting of:

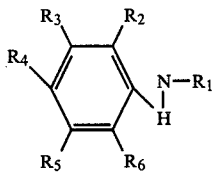
Structure I

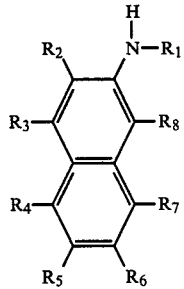
Structure II

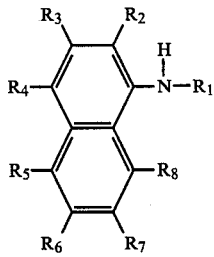
Structure III where $R_1$-$R_8$ = any one of the following:

—H, —$(CH_2)_nCH_3$ (n = o to 10), —$OCH_3$, —$OC_2H_5$, —$NH_2$

—Cl, —F, —Br, —I, —CN, —$SO_3H$, —$\underset{O}{\overset{\|}{C}}$—OH, —$\underset{CH_3}{\overset{|}{C}}$=O —$NO_2$, —$(CH_2)_m$—$\underset{X}{\overset{|}{(CH)}_n}$—$(CH_2)_l$—$CH_3$ (where m, n, l = 0 to 5 and X = any of the above groups)

3. The method of claims 1 or 2 wherein the acidic solution is selected from the group consisting of HCl, $H_2SO_4$, $H_3PO_4$, acetic acid, sodium acetate and potassium phthalates.

4. The method of claim 1 wherein the catalyst is selected from the group consisting of ferric, cupric, mercuric and stannic salts.

5. The method of claim 1 wherein the oxidant is selected from the group consisting of hydrogen peroxide and potassium chromate or any oxidant with standard potential higher than 0.77 volt with respect to a standard hydrogen electrode.

6. The method of claim 1 which includes:
applying the catalyst to the surface in a pattern;
coating subsequently the monomeric aniline and the oxidant on said surface to form a patterned electrochromic film.

7. The method of claim 1 wherein the surface is an electrode.

8. The method of claim 1 wherein the monomeric aniline is present in the acidic solution in an amount of between 1 to 30% by weight.

9. The method of claim 1 wherein the catalyst is present in the acidic solution in an amount of between 1 to 10% by weight.

10. The method of claim 1 wherein the oxidant is present in the solution in an amount of between 3 to 30% by weight.

11. The method of claim 1 which includes:
placing a polymer electrolyte in ion transfer relationship with the electrochromic film and wherein the polymer electrolyte is selected from the group consisting of Poly-(vinylsulfonic acid); [—$CH_2CH(SO_3H)$—]$_n$ or its salts; Poly-(acrylic acid), [—$CH_2CH(CO_2H)$—]$_n$; Poly-(styrene sulfonic acid), [—$CH_2CH(C_6H_4SO_3H)$—]$_n$; Poly-(2-acrylamido-2-methyl-1-propane-sulfonic acid), (—$CH_2CH[CONHC(CH_3)_2CH_2SO_3H$—]$_n$; Poly-(vinyl alcohol) (—$CH_2CH(OH)$—)$_n$; Poly(ethylene oxide), (—$CH_2CH_2O$—)$_n$; and Polyphosphazenes having the structure

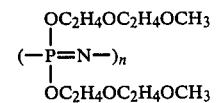

12. The method of claim 11 wherein the surface is a first electrode and the polymer electrolyte is placed in contact with a second electrode.

* * * * *

UNITED STATES PATENT AND TRADEMARK OFFICE
CERTIFICATE OF CORRECTION

PATENT NO. : 4,842,383
DATED : June 27, 1989
INVENTOR(S) : Sze C. Yang anf Robert L. Clark It is certified that error appears in the above-identified patent and that said Letters Patent is hereby corrected as shown below:

Column 2, lines 29-35 should read

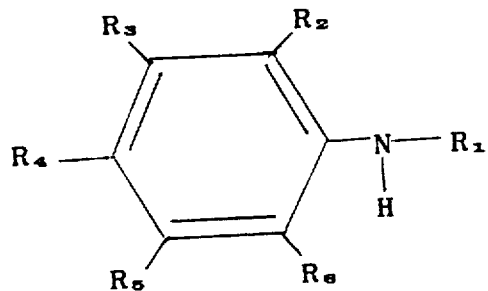

Structure I

UNITED STATES PATENT AND TRADEMARK OFFICE
CERTIFICATE OF CORRECTION

PATENT NO. : 4,842,383

DATED : June 27, 1989

INVENTOR(S) : Sze C. Yang and Robert L. Clark

It is certified that error appears in the above-identified patent and that said Letters Patent is hereby corrected as shown below:

Column 5, lines 3-8 should read

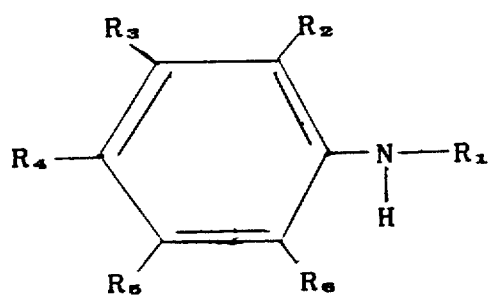

Structure I

Signed and Sealed this

Twenty-fourth Day of April, 1990

*Attest:*

HARRY F. MANBECK, JR.

*Attesting Officer*   Commissioner of Patents and Trademarks